Jan. 9, 1945.  J. C. BENDER  2,366,694

MEANS AND METHOD OF WELL LOGGING

Filed Nov. 21, 1941

J. C. BENDER
INVENTOR.

BY  Lester B. Clark

ATTORNEY.

Patented Jan. 9, 1945

2,366,694

UNITED STATES PATENT OFFICE 2,366,694

MEANS AND METHOD OF WELL LOGGING

John C. Bender, Houston, Tex., assignor to McCullough Tool Company, Houston, Tex., a corporation of Nevada Application November 21, 1941, Serial No. 419,892

6 Claims. (Cl. 73—151)

This invention relates to method and apparatus for electrically determining the location, nature and extent of subterranean earth formations penetrated by a well bore and is of particular utility in obtaining such information in well bores in which casing has been set although it is to be understood that the invention is not confined to use in cased bore holes.

The invention is based upon the discovery that temperature conditions downwardly from the surface of the earth vary and that information of the direction and amount of temperature variations constitutes an index of the location, nature and extent of the respective formations. The invention utilizes this discovery by electrically ascertaining temperature stratification of a liquid within a bore hole and such operation may be successfully carried out whether the bore hole is an open hole or is a cased hole. In other words, the invention is concerned with method and apparatus for determining variations in temperature conditions in a well bore as an index of the geological formations penetrated thereby.

The primary object of the invention is to log a hole by determining the variations in the electrical conductivity of fluid therein as a measure of the variations in temperature or temperature stratification in such fluid.

A more specific object is to log a well by first establishing substantially uniform conditions within the fluid in the bore hole and thereafter measuring temperature stratification within the fluid.

It is also an object of the invention to provide a temperature log of a hole by first modifying the fluid in the well to alter the coefficient of thermoresistivity, as by the titration of the fluid with an acid or base, and thereafter measuring the temperature stratification of such fluid.

Still another object is to provide method and apparatus wherein compensation is provided for the general temperature gradient existing between widely spaced levels in the earth.

The foregoing objects will be more fully apparent, together with other objects, from a consideration of the following description taken in connection with the accompanying drawing in which.

Figures 1, 2:
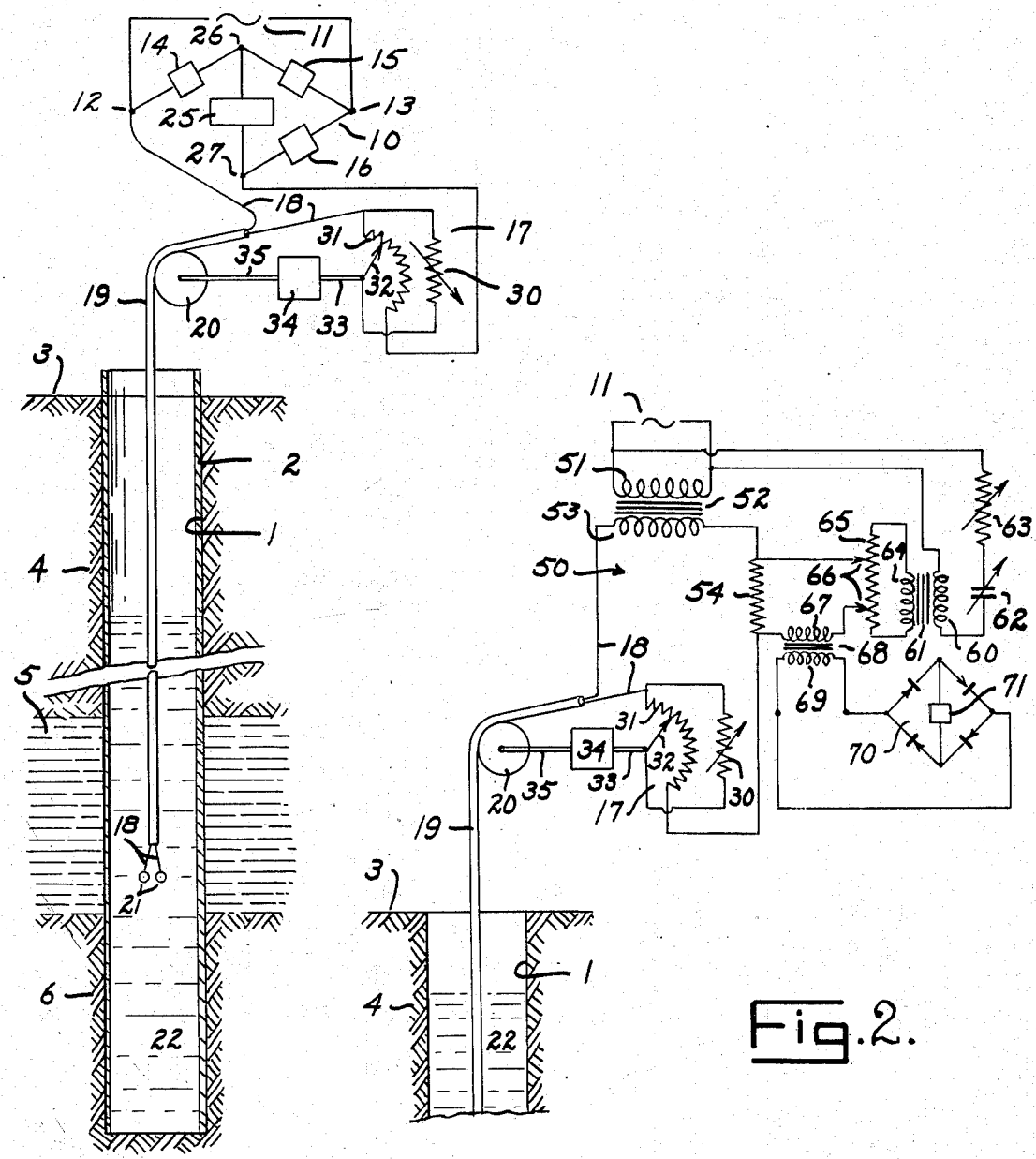
Fig. 1 is a diagrammatic illustration of the apparatus of the invention, such apparatus being capable of carrying out the novel method of the invention.
Fig. 2 represents an alternative construction of the apparatus of the invention.

In the drawing the reference character 1 designates a bore hole which is shown in Fig. 1 as provided with a casing 2 extending from the surface 3 downwardly to and through the formations 4, 5 and 6 of which information is desired, particularly as regards the potential production of oil, gas or other subsurface deposits.

As shown in Fig. 1, the exploring equipment comprises an impedance bridge generally referred to as 10 and comprising a source 11 of alternating current connected to the terminals 12 and 13 between which are parallel paths, one of which comprises impedance arms 14 and 15 and the other of which comprises the impedance arm 16 and a series connected arm which includes a compensator 17 and conductors 18, constituting cable 19, which passes over a pulley 20 and extends downwardly into the well bore 1. The conductors 18 terminate at their lower ends in spaced electrodes 21 by means of which electrical contact is made with the liquid 22 in the well bore.

The variations in the conductivity of the fluid 22 between the electrodes 21 is exhibited and/or recorded by means of an amplifier and recorder 25 connected at the points 26 and 27 intermediate the arms of the respective pairs of the impedance bridge 10.

The temperature within the earth increases generally with depth beneath the surface 3, such temperature gradient being in addition to the temperature conditions which exist by virtue of the characteristics of the various formations 4, 5 and 6. Such increase in temperature tends to create a constant drift in the indication of the instrument 25 and in order to obviate such drift, which is of little or no significance, the compensator 17 is connected in the unknown arm of the bridge. This compensator comprises a manually adjustable resistor 30 which shunts a portion of a variable resistor 31 having a sliding contact 32.

The contact arm 32 is attached to and is driven by a shaft 33 which is driven through a reduction gear 34 by shaft 35 operatively connected to the sheave 20 over which the cable 19 passes. By means of this construction the total resistance of the compensator 17 is so changed, while the position of the electrodes 21 are moved in the well, that complete compensation is made for the general temperature gradient downwardly from the surface 3.

In Fig. 2 the bore hole 1 is shown as an open hole and, as already indicated, it is intended that the invention is equally applicable whether the bore hole is cased or uncased. In this embodiment of the invention the measuring mechanism is shown as comprising an alternating current potentiometer 50 which is connected to the conductors 18 in the cable 19, the compensator 17 being the same as that shown in Fig. 1 and serving the same function.

It seems apparent that the source 11 of alternating current applied to the primary 51 of transformer 52 will induce an alternating potential in the secondary windings 53, which potential is applied between the electrodes 21, the resulting current passing through a resistor 54 and the compensator 17.

The potential applied to the primary terminals of the transformer 52 is also applied to the primary winding 60 of a transformer 61, an impedance comprising a variable capacitance 62 and variable resistance 63 being connected in series with such primary winding. The potential induced in the secondary winding 64 of the transformer 61 is applied to the terminals of a tapped resistor 65 to which the potential drop across the resistor 54 is applied.

When circuit conditions are such that there is a departure from a null setting, current is caused to flow in the circuit comprising the resistor 54 and that portion of the resistor 65 lying between the contact points 66. This current flows through the primary 67 of the transformer 68 of which the secondary 69 is connected to a rectifier 70 to which an amplifier and recorder 71 is connected. As just indicated, it seems apparent that the amplifier and recorder 71 is effective to indicate the variations in conductivity of the fluid between the electrodes 21 attached to the lower ends of the conductors 18 and that in this manner the indication of the graphical record produced by the instrument 71 is indicative of the temperature stratification of the liquid 22 within the well.

From the foregoing description it is believed that the manner of operation of the apparatus of the invention is apparent. By way of summary it may be stated that regardless of whether the alternating current bridge shown in Fig. 1 of the drawing or the alternating current potentiometer shown in Fig. 2 of the drawing is used, operations are initiated by lowering the electrodes 21 into the liquid 22 within the well bore 1. The compensator 17 is so adjusted that the effect of the general temperature gradient within the well bore is eliminated from the indication or record obtained by means of the instrument 25 or the instrument 71. The electrodes 21 are then made to traverse the well bore and during such step, observations are made either by observing the indication of the instrument 25 or 71 or by utilizing such instrument to make a continuous record which is correlated with the depth of the electrodes 21 in the well bore. In this manner it is possible to determine the variations in electrical conductivity of the fluid 22 in the well bore and hence to determine the temperature stratification in such liquid.

Attention is also directed to the fact that preliminary to the making of observations static temperature conditions of the liquid 22 in the well bore is disturbed by circulating fluid into and from the well bore whereby homogeneous temperature conditions are obtained. Alternatively it is possible to lower within the well bore a medium which tends to change the general temperature of the fluid 22 in the bore. For example, the temperature of the fluid column may be generally lowered by lowering a quantity of refrigerant, such as dry ice or other cooling medium, through the fluid 22 whereby unbalanced temperature conditions are established. The significant temperature conditions as regards the individual strata 4, 5 and 6 immediately begins to alter the temperature conditions obtained after a period of hours has elapsed. Thereupon the obtaining of a log in the manner above indicated reveals the temperature stratification conditions which result and such log provides desired information relative to the locations, nature and extent of the formations penetrated by the well bore 1.

Recognition is also made of the fact that with the chemical composition of the fluids which are usually present in a well bore, the electrical conductivity of such fluids is not linear with the temperature and that the conductivity-temperature curve may pass through a maximum and/or minimum within the range of temperatures encountered in the well. This invention also comprehends the addition to the fluids in the well of a quantity of chemical which tends to linearize the conductivity-temperature curve so as to facilitate the making of the curve and provide a curve from which the maximum of information is made available. It has been found, for example, that the addition and distribution of a limited amount of potassium chloride in the well fluid causes the conductivity-temperature curve to approach a straight line whereby the advantages above indicated are brought about.

While specific illustrations of technique and embodiments of apparatus have been shown it is to be understood that the invention is not confined thereto since the present invention broadly comprehends novel method and apparatus for electrically determining temperature stratification within a bore hole as an indication of the location, nature and extent of the subsurface formations penetrated by such bore hole.

What is claimed is:

1. The method of logging bore holes comprising the steps of establishing substantially uniform temperature conditions within the fluid in the bore hole, thereafter lowering a pair of spaced electrodes within the fluid, measuring by an electrical connection through the lowering means the variations in the electrical conductivity of the fluid between the electrodes at any particular period during the lowering step, and simultaneously adjusting the electrical resistance of the measuring circuit so as to compensate the measurements for the temperature gradient measurements for the temperature gradient between vertically spaced points in the earth.

2. The method of logging a bore hole comprising the steps of, adding to the fluids in the bore hole a chemical capable of inducing linearity of the conductivity-temperature curve of the well fluids, circulating the well fluids to distribute such chemical and to establish substantially uniform temperature conditions in the bore hole, traversing the bore hole with spaced electrodes, and measuring, during the traversing step, the variations in the electrical conductivity of the fluid acting as a conductor between the electrodes as a measure of the temperature stratification of the fluid.

3. In the method of electrically determining the location, nature and extent of subsurface strata penetrated by a bore hole the steps of, treating the well fluids to substantially linearize the conductivity-temperature curve of such fluids, altering the temperature of the fluids in the well from the temperature of the respective penetrated formations, lowering a pair of spaced electrodes within the fluid, and measuring at different levels in the bore hole the electrical conductivity of the fluid which serves as a conductor between the electrodes as a measure of stratified temperature conditions created by the penetrated formations.

4. The method of determining the nature of earth strata surrounding a bore hole comprising the steps of treating the fluid within the bore with a fluid to increase the temperature coefficient of conductivity of the fluid filling the bore hole, establishing substantially uniform temperature conditions in the bore hole, thereafter lowering a pair of spaced electrodes in the fluid, and measuring the variations in the conductivity of the fluid conductors at the space between the electrodes as a measure of the temperature stratification of the fluid correlatable with the formations penetrated by the bore hole.

5. Apparatus for electrically logging a well bore comprising a pair of electrodes adapted to be lowered into fluid within the well bore, means for moving said electrodes within the well bore, means for measuring the conductivity of the fluid between the electrodes during the movement of the electrodes as a measure of temperature stratification of the fluid, and means for automatically compensating for the temperature gradient between widely spaced levels in the well bore as the electrodes are moved in the bore by adjusting the electrical resistance of the measuring circuit.

6. The method of logging a bore hole comprising the steps of, adding to the fluids in the bore hole a chemical capable of inducing linearity of the conductivity-temperature curve of the well fluids, circulating the well fluids to distribute such chemical and to establish substantially uniform temperature conditions in the bore hole, traversing the bore hole with spaced electrodes, which are directly and electrically connected to the surface, and measuring, during the traversing step, the variations in the electrical conductivity of the fluid acting as a conductor between the electrodes as a measure of the temperature stratification of the fluid.

JOHN C. BENDER.